United States Patent
Nogami (10) Patent No.: US 6,719,577 B2
(45) Date of Patent: Apr. 13, 2004

(54) CARD CONNECTOR

(75) Inventor: Daisuke Nogami, Tokyo (JP)

(73) Assignee: Hirose Electric Co., Ltd., Tokyo (JP)

( * ) Notice: Subject to any disclaimer, the term of this patent is extended or adjusted under 35 U.S.C. 154(b) by 0 days.

(21) Appl. No.: 10/235,498

(22) Filed: Sep. 6, 2002

(65) Prior Publication Data

US 2003/0049968 A1 Mar. 13, 2003

(30) Foreign Application Priority Data

Sep. 7, 2001 (JP) ......................................... 2001-271567

(51) Int. Cl.⁷ ............................................... H01R 29/00
(52) U.S. Cl. ..................................... 439/188; 439/489
(58) Field of Search ............................... 439/188, 489; 200/51.09, 47, 61.09

(56) References Cited

U.S. PATENT DOCUMENTS 6,126,464 A * 10/2000 Chang ......................... 439/188
6,399,906 B1 * 6/2002 Sato et al. ................. 200/61.59
6,638,087 B1 * 10/2003 Takada et al. ............... 439/188
2002/0137380 A1 * 9/2002 Shishikura et al. .......... 439/188

FOREIGN PATENT DOCUMENTS

JP    2001-135383    5/2001

* cited by examiner

Primary Examiner—Hung V. Ngo
(74) Attorney, Agent, or Firm—Kanesaka & Takeuchi (57) ABSTRACT

A card connector (41) for electrically connecting a card (1) and a circuit board (90) includes a housing (42) for accommodating the card (1), a metal plate (64) forming a part of a wall (47) of the housing (1), and at least one metal piece (78, 79) provided along the metal plate (64_such that the metal piece (78, 79) is able to contact with and separate from the metal plate (64) to form at least one switch (91, 92). No wall (47) is necessary at the position of the metal plate (64) so that the thickness of the wall (47) is minimized.

6 Claims, 11 Drawing Sheets

FIG. 11 PRIOR ART

CARD CONNECTOR

BACKGROUND OF THE INVENTION

1. Field of the Invention

The present invention relates to a card connector for electrically connecting a card having a memory and a circuit board and, especially, to a card connector for a card comprising a write protection button for selecting write permit or write inhibit to the memory.

2. Description of the Related Art

Figure 7:
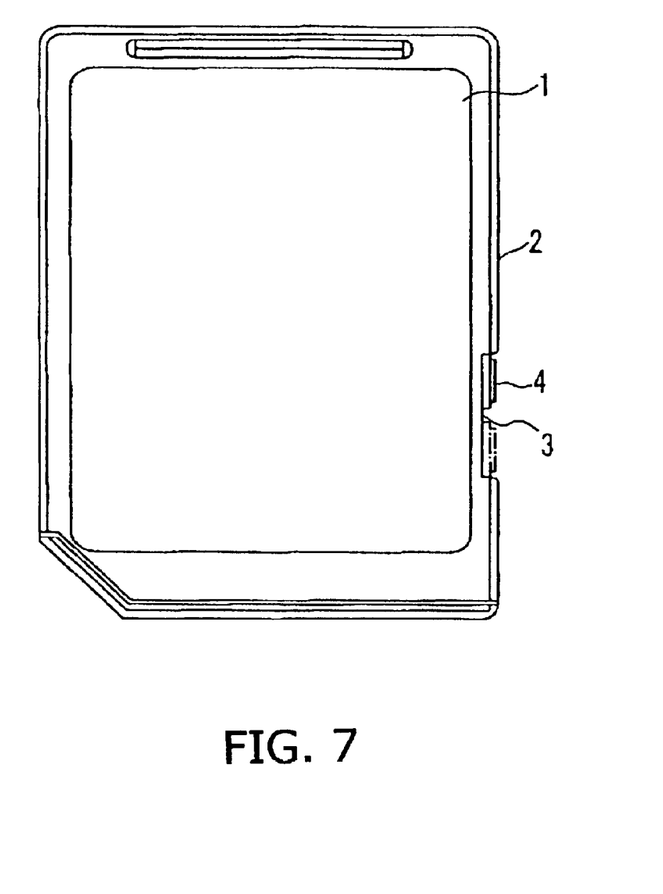
FIG. 7 is a top plan view of a card having a write protection button.

It is a recent trend that an electrical device, such as a portable telephone, is used together with a card having a built-in memory. As shown in FIG. 7, a card 1 is usually provided with a slidable write protection button 4 in a hollow formed in a side surface 2 thereof. Write permit or write inhibit to the built-in memory is selected by sliding the write protection button 4.

A conventional card connector for such a card as having the write protection button is described in Japanese Kokai No. 2001-135383. The conventional card connector in FIGS. 8–11 is provided with a first switch 8 arranged in a front wall 6 and a second switch 9 arranged in a side wall 7.

Figure 8:
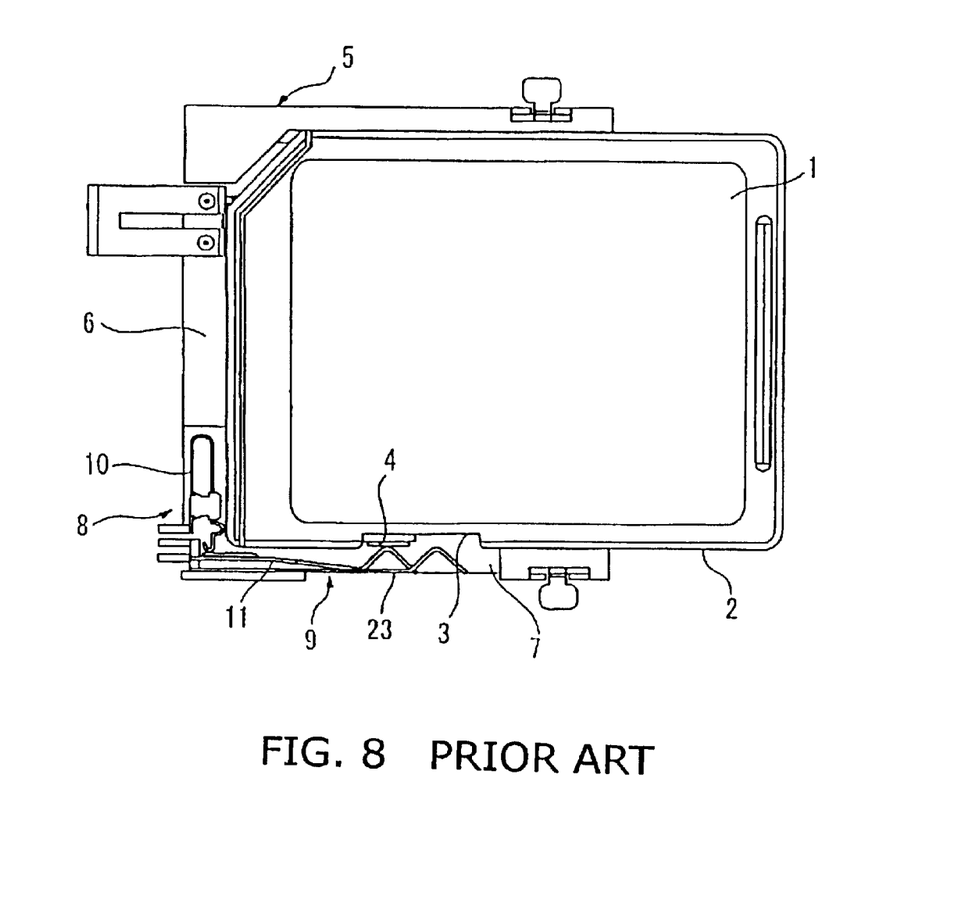
FIG. 8 is a top plan view of a card connector according to the prior art.
Figure 9:
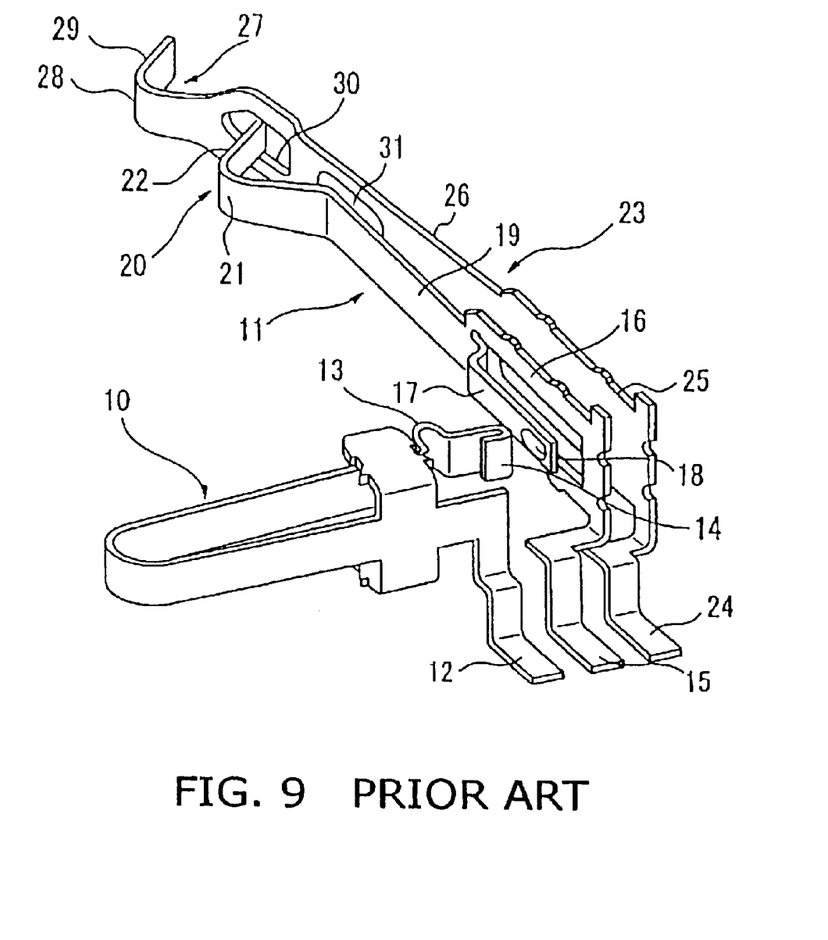
FIG. 9 is a perspective view of a switch according to the prior art.

The first switch 8 is formed by a first contact spring member 10 provided in the front wall 6 and made flexible in the back-and-forth direction, and a second contact spring member 11 provided along the side wall 7 and made flexible in a lateral direction. Insertion or removal of the card is detected by the state of contact or separation between the first and second contact spring members 10 and 11. The first contact member 10 is folded in the middle and comprises a front end portion 12, an abutting portion 13, and a contact portion 14. The front end portion 12 is bent so as to be connected to a circuit board (not shown). Both the abutting and contact portions 13 and 14 are provided at the other end opposed to the front end portion 12. The second contact member 11 comprises a front end portion 15 provided in parallel to the front end portion 12, a retaining portion 16 fixed to the side wall 7, a cantilever spring portion 17 extending forwardly from the retaining portion 16 and having a contact projection 18, and a cantilever spring member 19 extending rearwardly from the retaining portion 16 and having an abutting portion 20. The abutting portion 20 comprises a curved section 21 projecting into the inside of the card connector and a flat section 22 extending from the curved section 21.

The second switch 9 is formed by the second contact spring member 11 and a third contact spring member 23 provided outside and along the second contact spring member 11 and made flexible in a lateral direction. A sliding position of the write protection button 4 is detected by the contact and the separation between the second and third contact spring members 11 and 23. The third contact spring piece 23 comprises a front end portion 24 provided in parallel to the front end portions 12 and 15, a retaining portion 25 fixed to the side wall 7, a cantilever spring piece 26 extending rearwardly from the retaining portion 25 and having an abutting portion 27. The abutting portion 27 comprises a curved section 28 projecting into the inside of the card connector and a flat section 29 extending from the curved section 28. The cantilever spring piece 26 comprises an opening 30 at a position corresponding to the flat section 22 of the second contact spring member 11 and a contact projection 31 in front of the opening 30.

Figure 10:
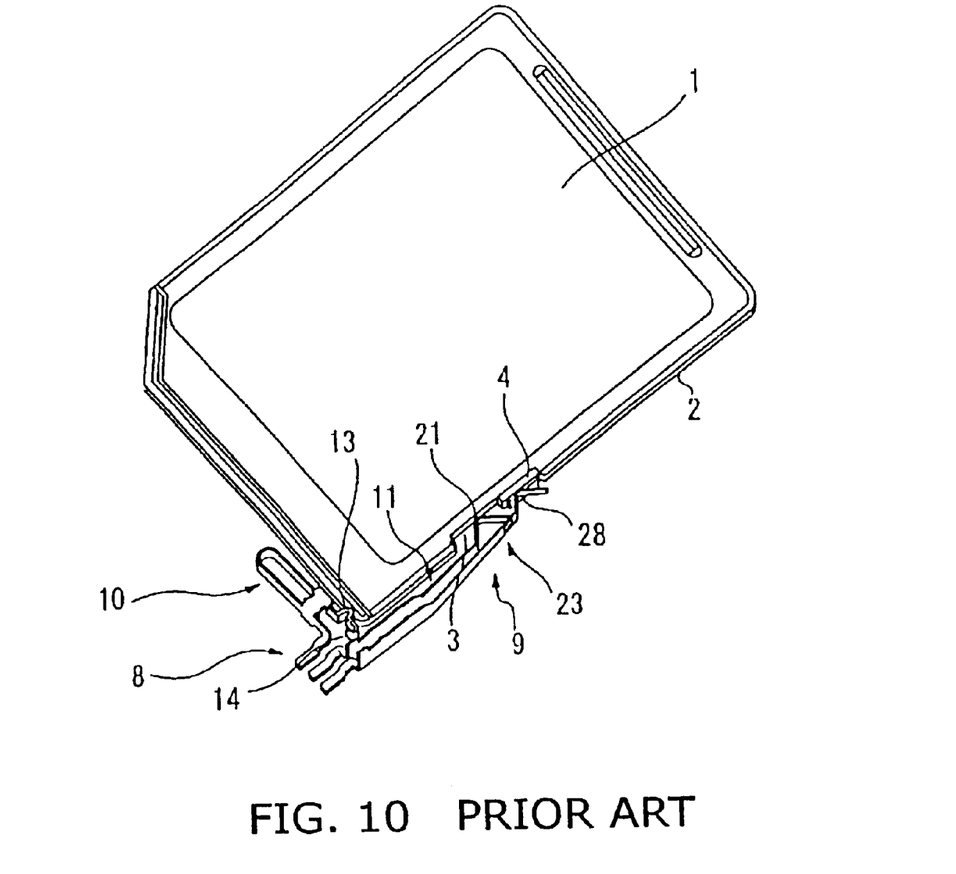
FIG. 10 is a perspective view of the card connector according to the prior art.

As shown in FIG. 10, when the card 1 is inserted into the housing 5 with the write protection button 4 at the back position (write permit position), the abutting portion 13 of the first contact spring member 10 is pushed by the front surface of the card 1 and the contact portion 14 is brought into contact with the contact projection 18 of the second contact spring member 11. As a result, the first switch 8 is turned on and the insertion of the card 1 is detected. At this point, the curved section 21 of the second contact spring member 11 abuts against the hollow 3 of the card 1 and the curved section 28 of the third contact spring member 23 abuts against the write protection button 4. Accordingly, the second and third contact spring members 11 and 23 are separated from each other. As a result, the second switch is turned off, and the write permit to the card 1 is detected.

Figure 11:
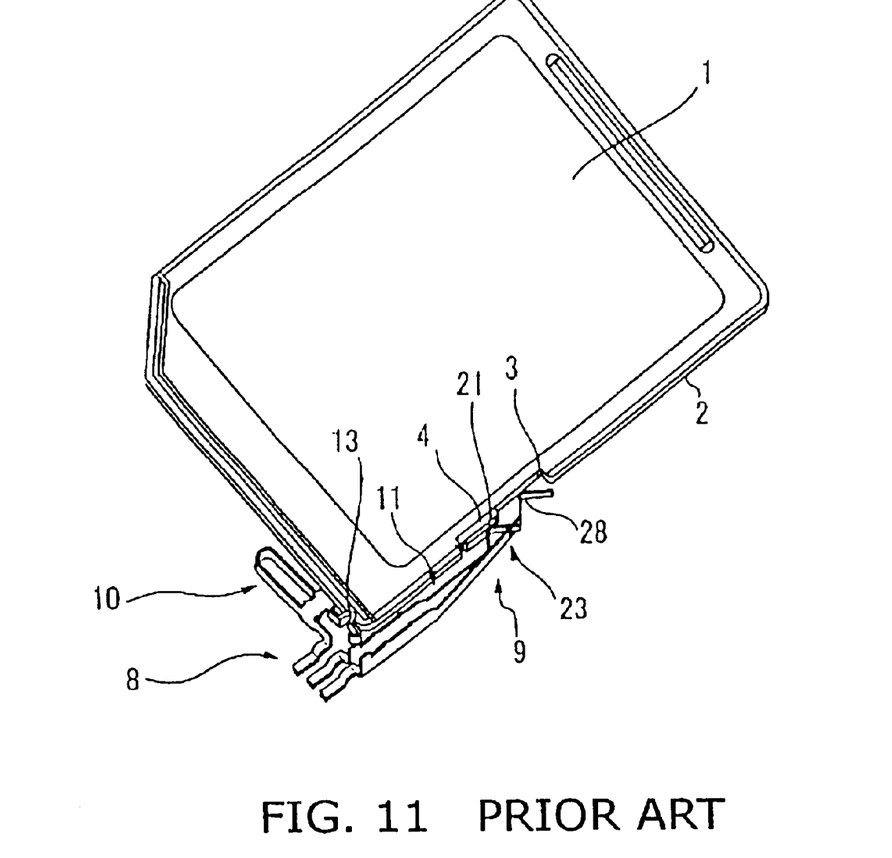
FIG. 11 is a perspective view of the card connector according to the prior art.

As shown in FIG. 11, when the card 1 is inserted into the housing 5 with the write protection button 4 at the forward position (write inhibit position), the contact portion 14 of the first contact spring member 10 is brought into contact with the contact projection 18 of the second contact spring member 11. As a result, the first switch 8 is turned on and the insertion of the card 1 is detected. At this time, the curved section 21 of the second contact spring member 11 abuts against the write protection button 4 and the curved section 28 of the third contact spring member 23 abuts against the hollow 3 of the card 1. Also, the flat section 22 of the second contact spring member 11 is inserted into the opening 30 of the third contact spring member 23. Accordingly, the second and third contact spring members 11 and 23 contact with each other through the contact projection 31. As a result, the second switch 9 is turned on, and the write inhibit to the card 1 is detected.

However, in such a conventional card connector, the second and third contact spring members 11 and 23 are fixed to the side wall 7 of the housing such that they form cantilevers to be flexible in the lateral direction and are not used as a part of the side wall 7 in view of the structure strength. A wall is necessary to be present at positions corresponding to those of the second and third contact spring members 11 and 23 as well as at the other positions. As a result, the side wall 7 becomes thick and it is difficult to minimize the size of the card connector.

In addition, since the members to form the switches 8 and 9 are provided in both the front and side walls 6 and 7, the manufacturing process is complicated and requires a large amount of time.

Moreover, since the first, second, and third contact spring members 10, 11 and 23 have different and complicated shapes, it is difficult to reduce the manufacturing cost.

SUMMARY OF THE INVENTION

Accordingly, it is an object of the present invention to provide a card connector, which enables to minimize the size of the connector and reduce the manufacturing cost.

According to an embodiment of the present invention, a card connector for electrically connecting a card and a circuit board comprises a housing for accommodating the card, a metal plate forming a part of a wall of the housing, and at least one metal piece provided along the metal plate such that the metal piece is anle to contact with and separate from the metal plate to form at least one switch.

According to another embodiment of the invention, the card comprises a slidable write protection button in a side surface thereof, the metal plate comprises first and second spring members made flexible in a lateral direction, and the at least one metal piece is composed of a first metal piece having a first contact portion which is contactable with and separatable from the first spring member to form a first switch for detecting insertion or removal of the card, and a second metal piece having a second contact portion which is contactable with and separatable from the second spring member to form a second switch for detecting a sliding position of the write protection button.

According to still another embodiment of the invention, the card comprises a slidable write protection button, the at least one metal piece is composed of a first metal piece having a first spring member made flexible in a lateral direction and a second metal piece having a second spring member made flexible in a lateral direction, and the metal plate comprises a first contact portion and a second contact portion, the first contact portion is contactable with and separatable from the first spring member to form a first switch for detecting insertion or removal of the card, and the second contact portion is contactable with and separatable from the second spring member to form a second switch for detecting a sliding position of the write protection button According to yet another embodiment of the invention, the first and second metal pieces have the same shape.

According to the present invention, the metal plate functions as a wall of the housing so that no wall is necessary at the position of the metal plate, thus reducing the thickness of the wall, thus minimizing the card connector.

DESCRIPTION OF THE PREFERRED EMBODIMENTS

The embodiments of the invention will be described with reference to the accompanying drawings.

Figure 1:
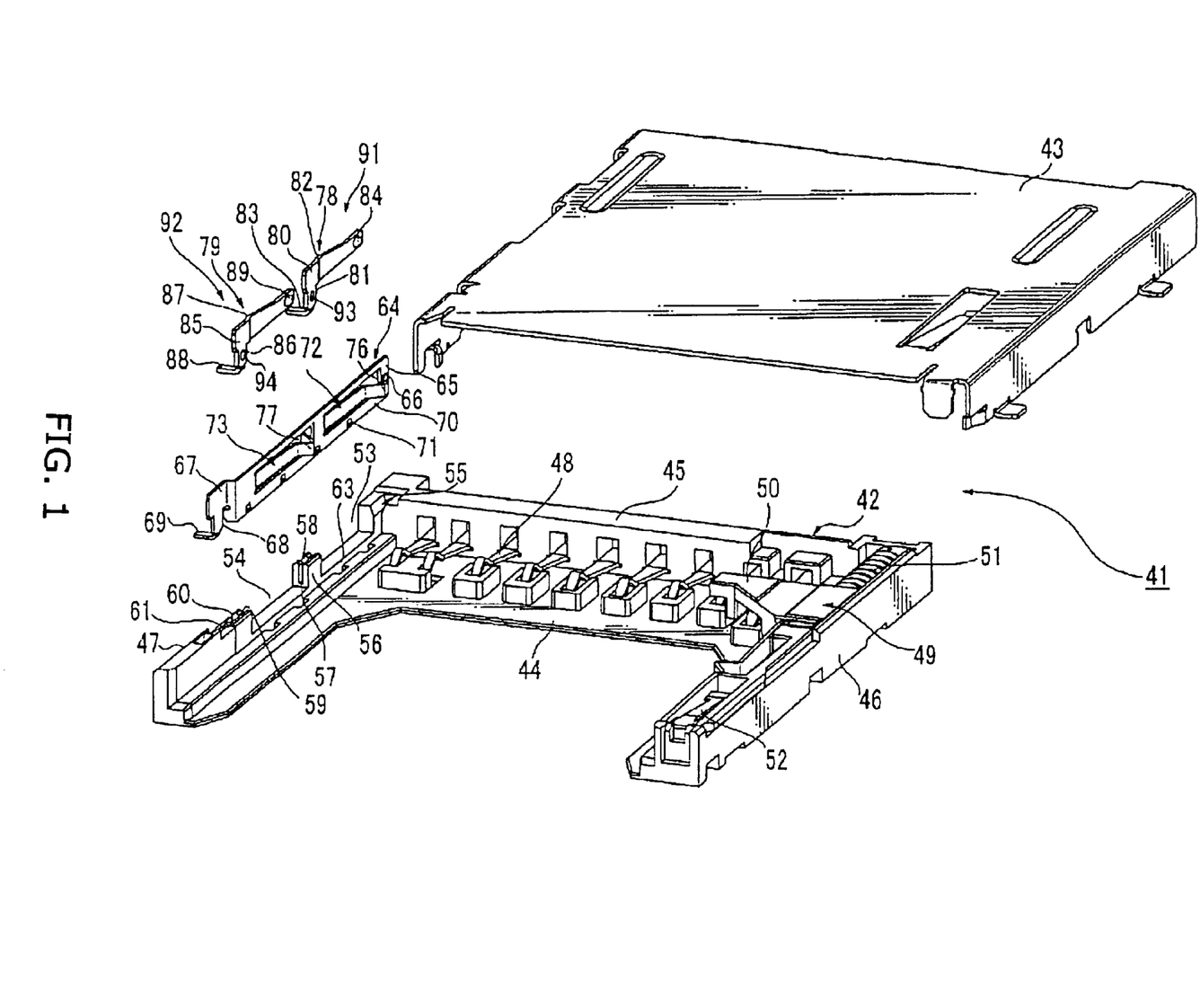
FIG. 1 is an exploded perspective view of a card connector according to an embodiment of the present invention.
Figure 2:
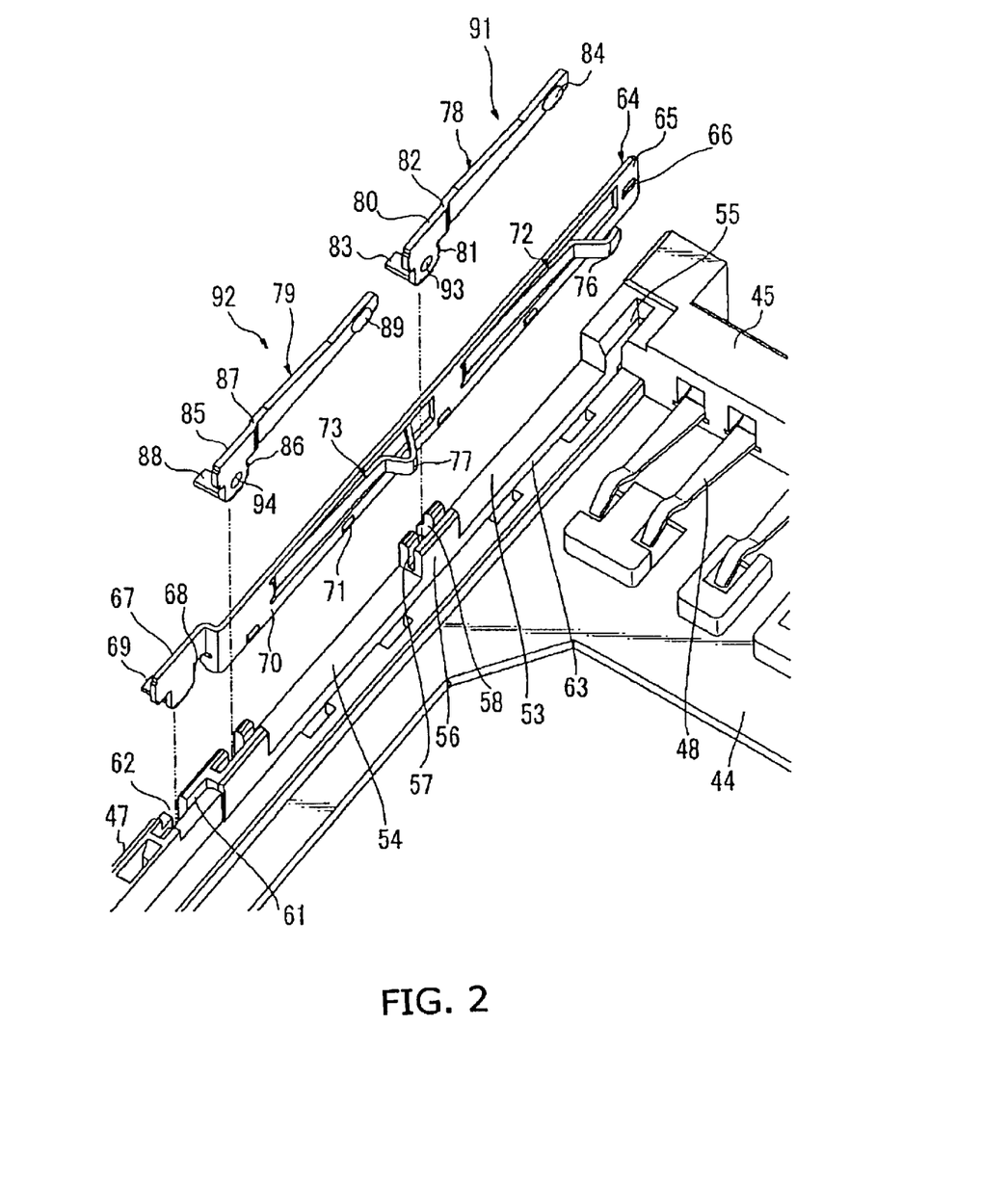
FIGS. 2 and 3 are exploded perspective views of a part of the card connector according to the embodiment of the present invention.
Figure 3:
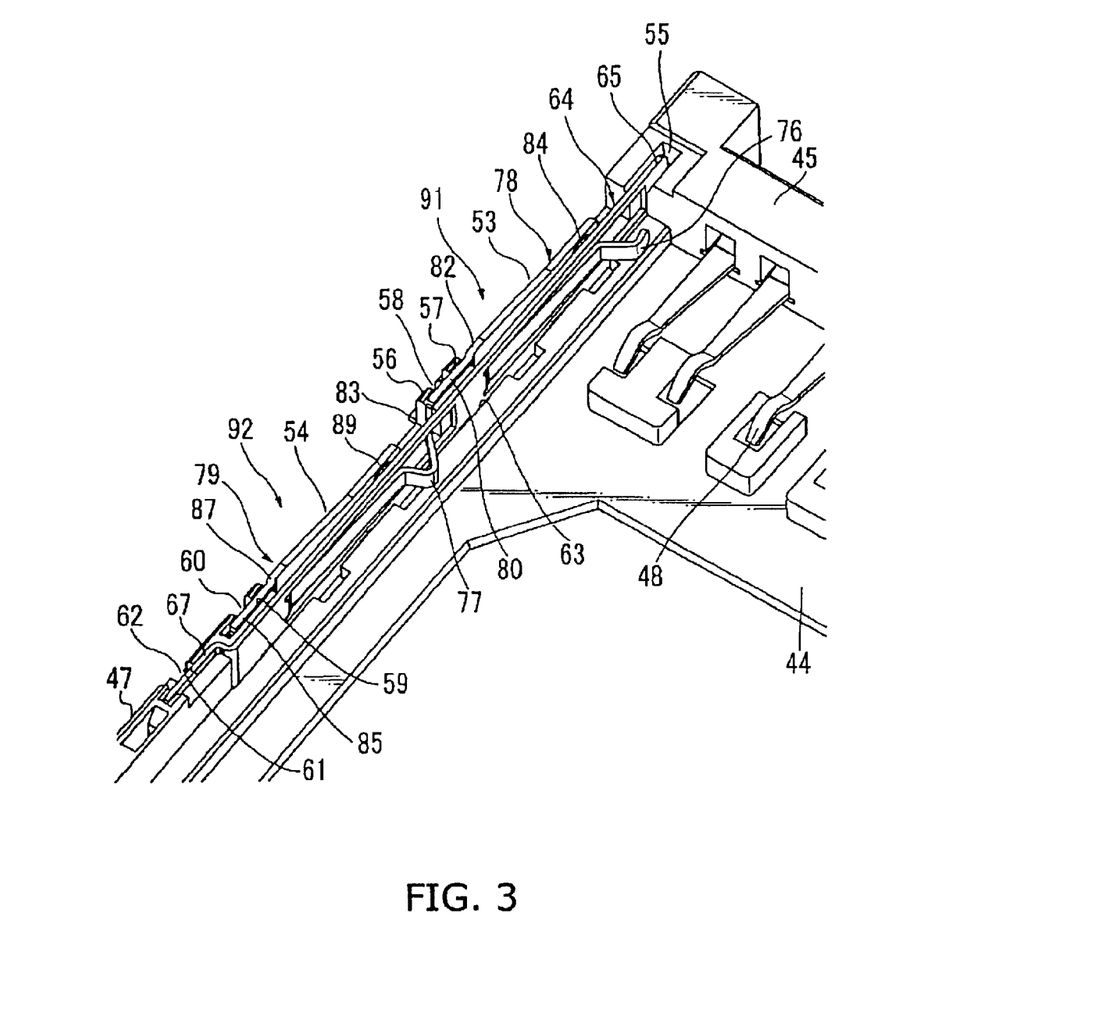
Figure 4:
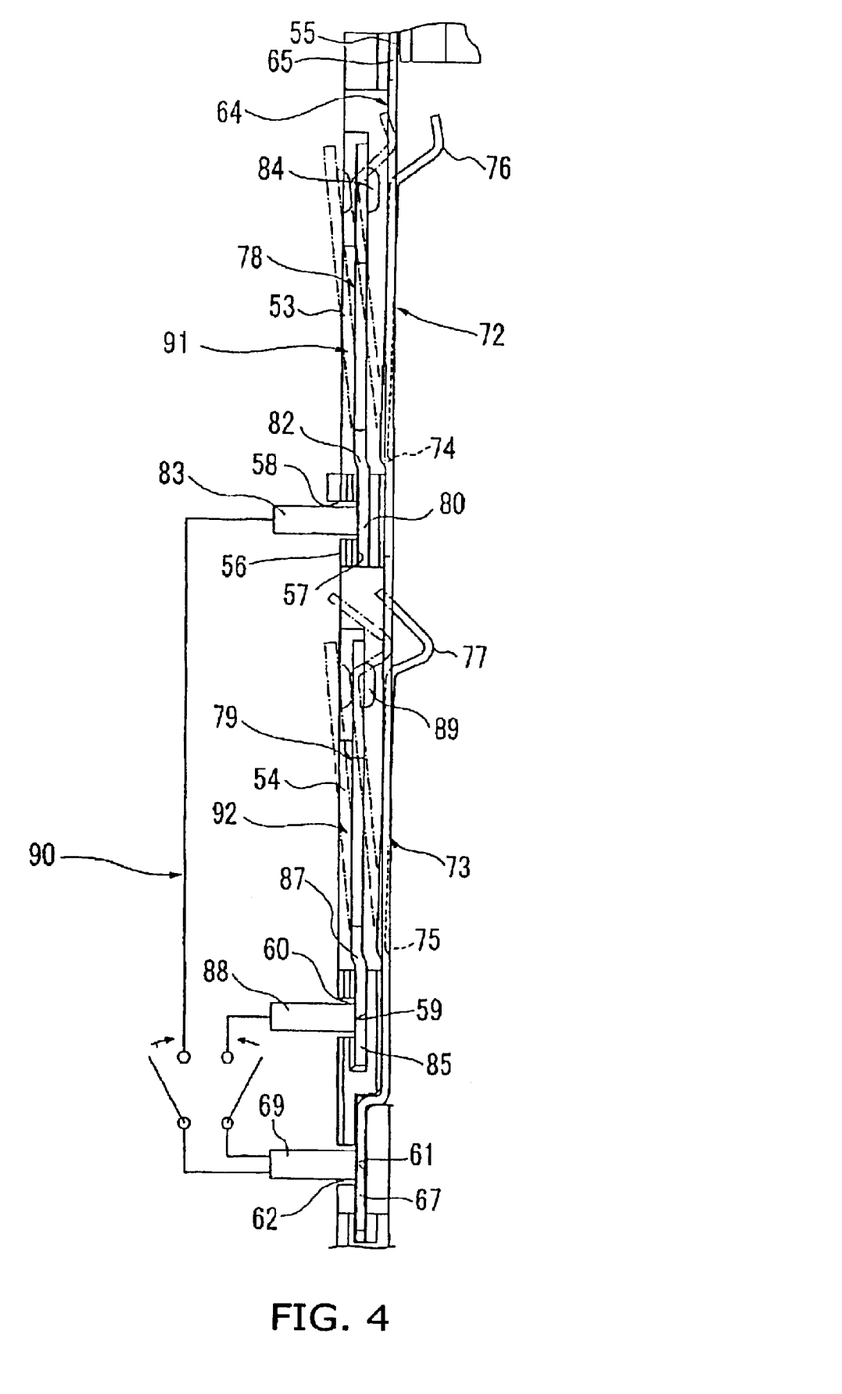
FIG. 4 is a top plan view of a part of the card connector according to the embodiment of the present invention.

In FIG. 1, A card connector 41 is provided with a housing 42 made of plastic for accommodating the card 1 shown in FIG. 7, and a housing cover 43 made of a metal for covering the top of the housing 42. Both ends of the housing cover 43 are bent downwardly to be attached to the housing 42. The housing 42 has a thin bottom plate 44, a front wall 45 provided at the front end of the bottom plate 44, and side walls 46 and 47 provided at the side ends of the bottom plate 44. A predetermined number of terminals 48 are arranged on the front side of the bottom plate 44 in parallel with each other. The front end of each terminal 48 penetrates the front wall 45 and projects into the outside of the housing 42.

A slider 49 is installed on one of the side walls 46 (right-hand side in FIG. 1) such that the slider 49 is movable back and forth. A contact portion 50 extends inwardly from the front end of the slider 49. The front end of the card 1 abuts against the rear end of the contact portion 50. A coil spring 51 is provided on the front side of the slider 49 to bias the slider 49 rearwardly. A locking member 52 is provided on the rear side of the side wall 46 to hold the card 1 in the housing 42.

First and second cut-off portions 53 and 54 are provided at the front and rear sides of the other wall 47 (left-hand side in FIG. 1), respectively. A front fixing groove 55 is provided on the front side of the first cut-off portion 53 and extends in the back-and-forth direction. A fixing portion 56 is provided between the first and second cut-off portions 53 and 54. A first fixing groove 57 is provided in the fixing portion 56 and extends in the back-and-forth direction. The first fixing groove 57 comprises a first cut-off groove 58 at the middle thereof. A second fixing groove 59 is provided on the rear side of the second cut-off portion 54 and extends in the back-and-forth direction. The second fixing groove 59 comprises a second cut-off groove 60 at the middle thereof. A rear fixing groove 61 is provided on the rear side of the second fixing groove 59 and extends in the back-and-forth direction. The rear fixing groove 61 comprises a third cut-off groove 62 at the middle thereof. The front end of the rear fixing groove 61 is bent inwardly. A shallow groove 63 extends along the inside of the side wall 47 from the front fixing groove 55 to the rear fixing groove 61. Although not shown in the drawings, an intermediate part of each of the first, second, and rear fixing grooves 57, 59, and 61 is deeper than the other parts thereof.

A long metal plate 64 is installed along the inside of the side wall 47 and covers the inside of the first and second cut-off portions 53 and 54, thus forming a part of the side wall 47. A front end 65 of the metal plate 64 is engaged with the front fixing groove 55. A projection 66 provided on the inside of the front end 65 determines the engaging position between the front end 65 and the metal plate 64. A rear end 67 of the metal plate 64 is press-fitted into the rear fixing portion 61 by a projection 68 provided therein. A lower part of the rear end 67 is bent outwardly to provide a connection portion 69. The connection portion 69 projects from the third cut-off groove 62 into the outside of the housing 42 and is connected to an electric circuit 90. A lower portion 70 of the metal plate 64 is engaged with the shallow groove 63. A plurality of projections 71 provided on the inside surface of the lower portion 70 determines the engagement position between the lower portion 70 and the shallow groove 63. First and second cantilever springs 72 and 73 made by stamping the metal plate 64 are provided in the metal plates 64 at positions corresponding to the first and second cut-off portions 53 and 54. The cantilever springs 72 and 73 are flexible in the horizontal direction around rear ends 74 and 75 thereof, respectively. The rear ends 72 and 73 are slightly curved outwardly. First and second contact portions 76 and 77 are provided at front ends of the cantilever springs 72 and 73, respectively, and project inwardly. Though the first and second cantilever springs 72 and 73 are made by stamping the metal plate 64, the metal plate 64 is sufficiently strong to form a part of the side wall 47 because it has a continuous peripheral part.

First and second metal pieces 78 and 79 have an identical shape and are installed on the outside of the metal plate 64 along the first and second cantilever springs 72 and 73, respectively. A rear end portion 80 of the first metal piece 78 is press-fitted into the first fixing groove 57 by projections 81 provided on both ends thereof in the same direction as the direction in which the metal plate 64 is press-fitted. As a result, the first metal piece 78 functions as a cantilever and is made flexible in the horizontal direction around a curved section 82. A projection 93 provided on the inside of the rear end portion 80 determines the press-fit position of the rear end portion 80. A lower part of the rear end portion 80 is bent outwardly to provide a connection section 83. The connection section 83 projects from the first cut-off groove 58 to the outside of the housing 42 and is connected to the electrical circuit 90. A first contact section 84 is provided at the insides of the front end portion of the first metal piece 78 such that it is brought into contact with the first cantilever spring 72. Similarly, the second metal piece 79 comprises a rear end portion 85, a projection 86, a curved section 87, a connection section 88, a second contact section 89, and a projection 94. The rear end portion 85 is press-fitted into the second fixing groove 59 by a projection 86 in the same direction as the press-fit direction of the metal plate 64, and the second contact section 89 makes contact with the second cantilever spring 73. Thus, the first cantilever spring 72 and the first metal piece 79 form a first switch 91, and the second cantilever spring 73 and the second metal piece 79 form a second switch 92.

An operation of the card connector 41 upon insertion and removal of the card 1 will be described below.

When the card 1 is inserted into the card connector 41 with the write protection button 4 at the back position (write permit position), the slider 49 advances with the card 1 along the side wall 46 and the card 1 is locked by the lock member 52 at the insertion position. The first contact section 76 of the first cantilever spring 72 is pushed by the side surface of the card 1 to flex outwardly. As a result, the first contact section 84 of the first metal piece 78 also flexes outwardly and contacts with the first cantilever spring 72 to provide a wiping effect. Consequently, the first switch 91 is turned on, and the insertion of the card 1 is detected. Simultaneously, the second contact section 77 of the second cantilever spring 73 is abutted against the write protection button 4 to flex outwardly. As a result, the second contacts section 89 of the second metal piece 79 also flexes outwardly and contacts with the second cantilever spring 73 to provide wiping effect. Consequently, the second switch 92 is turned on, and the write permit condition of the card 1 is detected.

When the card 1 is inserted into the card connector 41 with the write protection button 4 at the forward position (write inhibit position), the first cantilever spring 72 contacts with the first contact section 84 of the first cantilever spring 72 to provide wiping effect. Consequently, the first switch 91 is turned on, and the insertion of the card 1 is detected. At this time, the second contact section 77 of the second cantilever spring 73 is positioned at the hollow 3 of the card 1 so that it is separated from the second metal piece 79. Consequently, the second switch 92 is turned off, and the write inhibit condition of the card 1 is detected.

When the card 1 is further pushed forwardly, the locking member 52 is unlocked so that the card 1 retreats to the released position by the spring force of the coil spring 51. At this point, the first cantilever spring 72 returns to the original condition so that it is separated from the first metal piece 78. Consequently, the first switch 91 is turned off, and the removal of the card 1 is detected.

Figure 5:
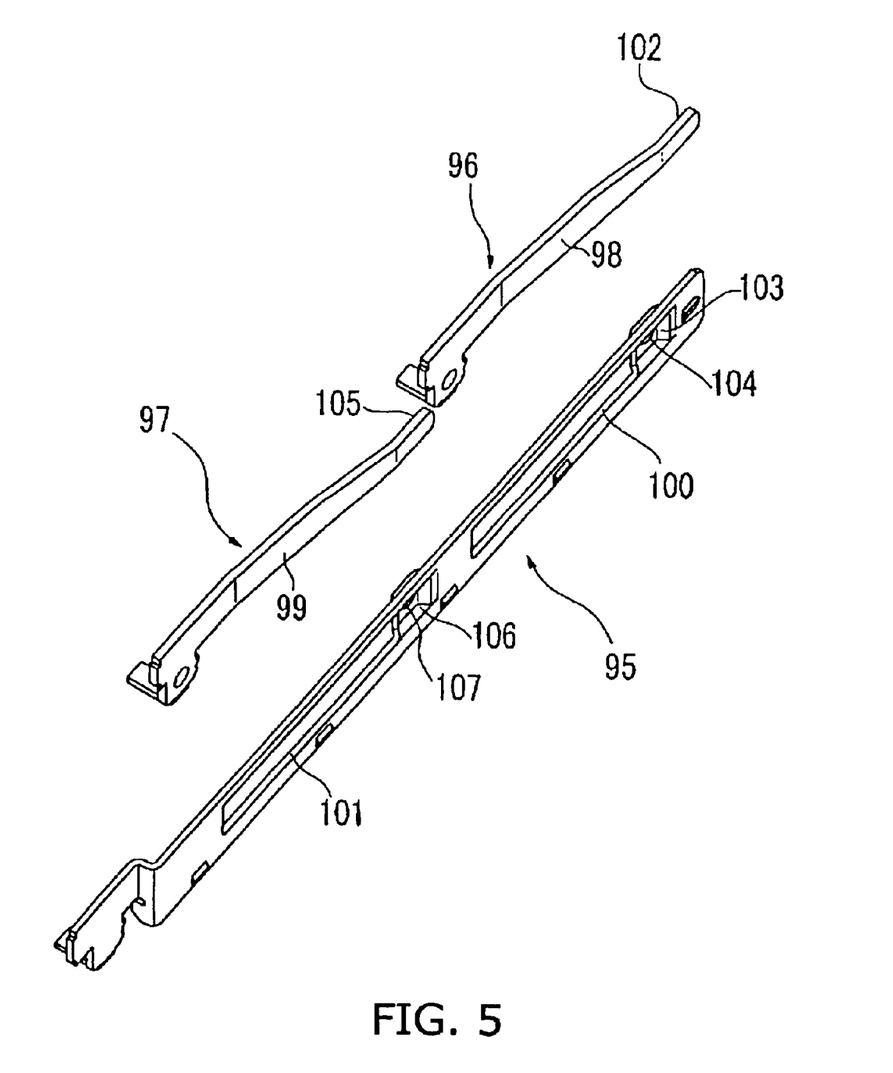
FIG. 5 is a perspective view of a switch according to another embodiment of the invention.
Figure 6:
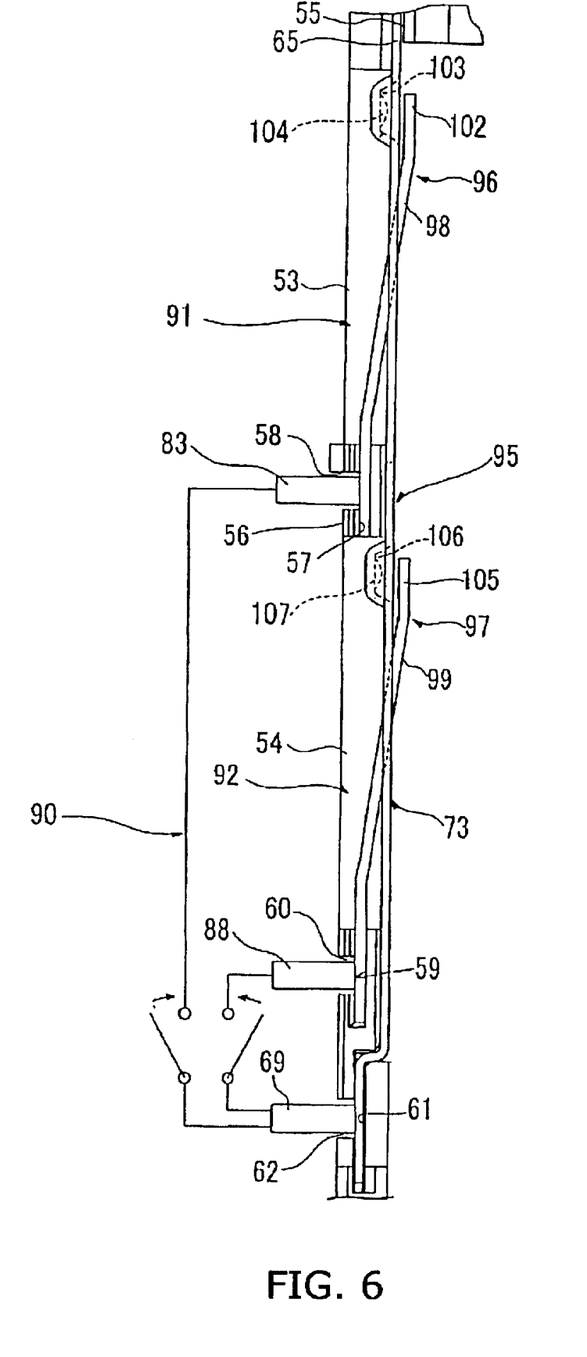
FIG. 6 is a top plan view of the switch according to the second embodiment of the invention.

The first and second switches 91 and 92 are not limited to the above structure. For example, in FIGS. 5 and 6, first and second metal pieces 96 and 97 are provided with first and second spring pieces 98 and 99, respectively, such that the first and second spring pieces 98 and 99 go through first and second openings 100 and 101 provided on the metal plate 95. In this case, when an front end 102 of the first metal piece 96 is brought into contact with a first contact section 104 provided in a hollow 103 of the metal plate 95, the insertion of the card 1 is detected, and when the front end 105 of the second metal piece 97 is brought into contact with or separated from a second contact section 107 provided in a hollow 106 of the metal plate 95, the sliding position (write permit or write inhibit position) of the write protection button 4 is detected.

In the above embodiment, when the card 1 is inserted into the card connector 41, the first switch 91 is turned on. However, the first switch 91 may be turned off, when the card 1 is inserted into the card connector 41. Similarly, the second switch 92 may be made to operate in the opposite that way to the above.

The first and second metal pieces 78 and 79 may have different shapes.

The first and second switches 91 and 92 may be provided on a different wall, such as the rear side of the side wall 47. Where the write protection button 4 is provided on the front end of the card 1, the first and second switches 91 and 92 may be provided in the front wall 45.

According to the present invention, the metal plate functions as the wall of the housing so that no wall is necessary at the position of the metal plate, thus reducing the thickness of the wall, minimizing the card connector.

In addition, since the members forming the each switch are integrally arranged in one position, and the shape of the housing is simplified, the assembling work is made easy.

Moreover, since the first and second metal pieces are of the same shape, only two kinds of element are necessary to form each switch, thus reducing the manufacturing cost.

What is claimed is:

1. A card connector for electrically connecting a card and a circuit board, comprising:

a housing for accommodating said card;

a rigid metal plate forming a part of an inner wall of said housing for contacting with and directly guiding said card, and having at least one cantilever spring piece provided at a cut-out portion in said rigid metal plate and projecting into an inside of said housing so that said cantilever spring piece is flexed outwardly by said card; and at least one metal piece provided along said metal plate such that said metal piece is able to contact with and separate from said cantilever spring piece of said metal plate to form at least one switch.

2. The card connector according to claim 1, wherein said rigid metal plate and said cantilever spring piece are integrally formed.

3. A card connector for electrically connecting a card and a circuit board, comprising:

a housing for accommodating said card;

a metal plate forming a part of a wall of said housing; and at least one metal piece provided along said metal plate such that said metal piece is able to contact with and separate from said metal plate to form at least one switch, wherein said card comprises a slidable write protection button in a side surface thereof, said metal plate comprises first and second spring members made flexible in a lateral direction, and said at least one metal piece is composed of a first metal piece having a first contact portion which is contactable with and separatable from said first spring member to form a first switch for detecting insertion or removal of said card, and a second metal piece having a second contact portion which is contactable with and separatable from said second spring member to form a second switch for detecting a sliding position of said write protection button.

4. The card connector according to claim 3, wherein said first and second metal pieces have the same shape.

5. A card connector for electrically connecting a card and a circuit board, comprising:

a housing for accommodating said card;

a metal plate forming a part of a wall of said housing; and at least one metal piece provided along said metal plate such that said metal piece is able to contact with and separate from said metal plate to form at least one switch, wherein said card comprises a slidable write protection button, said at least one metal piece is composed of a first metal piece having a first spring member made flexible in a lateral direction and a second metal piece having a second spring member made flexible in a lateral direction, and said metal plate comprises a first contact portion and a second contact portion, said first contact portion being contactable with and separatable from said first spring member to form a first switch for detecting insertion or removal of said card, and said second contact portion being contactable with and separatable from said second spring member to form a second switch for detecting a sliding position of said write protection button.

6. The card connector according to claim 5, wherein said first and second metal pieces have the same shape.

* * * * *